(12) United States Patent
Bertin et al.

(10) Patent No.: US 9,195,930 B2
(45) Date of Patent: Nov. 24, 2015

(54) METHOD FOR MANUFACTURING A CARD BASED ON A SUBSTRATE

(75) Inventors: Marc Bertin, La Celle les Bordes (FR); Gérald Galan, Ville D'Avray (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 759 days.

(21) Appl. No.: 13/219,351

(22) Filed: Aug. 26, 2011

(65) Prior Publication Data

US 2012/0048948 A1 Mar. 1, 2012

(30) Foreign Application Priority Data

Aug. 26, 2010 (FR) .................................... 10 56776

(51) Int. Cl.
*G06K 19/06* (2006.01)
*G06K 19/077* (2006.01)
(52) U.S. Cl.
CPC .... *G06K 19/07743* (2013.01); *G06K 19/07716* (2013.01); *Y10T 29/49124* (2015.01)
(58) Field of Classification Search
CPC ........... H01L 2224/48091; H01L 2224/48227; H01L 2924/00014; H05K 1/117; H05K 2201/10159; H05K 2203/1316; H05K 3/284
USPC ......................................................... 235/492
See application file for complete search history.

(56) References Cited

U.S. PATENT DOCUMENTS

2007/0125866 A1* 6/2007 Nishizawa et al. ........... 235/492
2007/0164120 A1 7/2007 Jow
2011/0163168 A1* 7/2011 Gallo ............................ 235/492

FOREIGN PATENT DOCUMENTS

EP          1 596 326          11/2005
WO      WO 2010/041245        4/2010

* cited by examiner

*Primary Examiner* — Thien M Le
*Assistant Examiner* — Tae Kim
(74) *Attorney, Agent, or Firm* — Cozen O'Connor

(57) ABSTRACT

A method for manufacturing a card (102) based on a substrate (101), the method comprising a step of defining the perimeter of the card (102) within the substrate (101), the method also comprising a step of chamfering on a portion of the perimeter of the card (102) so that on completion of the perimeter definition and chamfering steps the physical dimensions of the card (102) are compliant with the parameters A, Ai, B, Bj, C2, C3, and Rm defined by that Micro SD card standard designated V3.00, wherein: $i=1, 6\ldots 8$; $j=1, 4, 10, 11, x, y$ (the pair [x,y] being equal to [6,9] or to [14,15]); and $m=1\ldots 6, 17\ldots 19$, the physical dimensions of the card (102) also being compliant with the parameter A9 of the standard when $x=6$ and $y=9$.

13 Claims, 5 Drawing Sheets

METHOD FOR MANUFACTURING A CARD BASED ON A SUBSTRATE

RELATED APPLICATIONS

This application claims the priority of French application no. 10/56776 filed Aug. 26, 2010, the content of which is hereby incorporated by reference

FIELD OF THE INVENTION

The present invention is related to the technical field of card manufacture based on a substrate.

It applies in particular, and without limitation, to the manufacture of microcircuit cards with contact pads for which the microcircuit and the contact pads are part of a detachable wafer partly cut out of a card body as described in document FR 2 805 206 of the applicant.

The invention applies more particularly to the manufacture of cards having physical dimensions complying with or approximating the Micro SD™ e-card standard referred to as follows:

"SD specifications, Part 1, microSD Card Specifications, Version 3.00, Feb. 18, 2010."

In the remainder of the present document, this standard established by the Technical Committee, SD Card Association will be referred to by the expression "Micro SD standard" or "Micro SD standard V3.00."

BACKGROUND OF THE INVENTION

The use of cards of the Micro SD type has had a growing success in recent years. These cards are of particular advantage in mobile applications and are used for example as memory cards in mobile telephones. These cards are generally manufactured based on a molding technique and consequently require specific fabrication equipment.

The Applicant has observed, however, that the conventional manufacturing techniques for this type of card are not satisfactory. In particular, the fabrication equipment generally used has production rates that are too low and is not always able to carry out all the necessary technological steps. Thus, this equipment is often not able to customize cards, for example by printing decorative designs on their surfaces, or even by electrically configuring the cards once manufactured.

SUMMARY OF THE INVENTION

One object of the invention is to provide a manufacturing method for cards whose physical dimensions are compliant with or approximate the Micro SD standard, while using production equipment designed for working on different card formats.

One aspect of the invention is directed to a method for manufacturing a card based on a substrate having a predetermined thickness, the method comprising:

a step of defining a card perimeter within the substrate, the method also comprising a step of forming a chamfer (or "chamfering" step) on a portion of the card perimeter, and in that, at the end of the card perimeter definition step and of the chamfering step, the physical dimensions of the card are compliant with the parameters A, Ai, B, Bj, C2, C3, and Rm defined by the Micro SD card standard designated V3.00, wherein:

$i=1, 6 \ldots 8$;

$j=1, 4, 10, 11, x, y$, the pair $[x, y]$ being equal to $[6,9]$ or to $[14,15]$; and $m=1 \ldots 6, 17 \ldots 19$;

the physical dimensions also being compliant with the parameter A9 of said standard when $x=6$ and $y=9$, wherein the perimeter definition step and the chamfer forming step are carried out before the card is extracted from said substrate.

The substrate mentioned above is preferably flat.

The extraction of the card is carried out by manually detaching the card from its substrate (or with the help of a machine).

The present invention also makes it possible to manufacture Micro SD format cards (or a close approximation), and to do so starting with a substrate the physical dimensions whereof are suited to appropriate production equipment. In this way, it is possible to improve the speed and the quality of production of Micro SD format cards or an approximation.

In addition, the perimeter definition step can comprise at least one of the following sub-steps:

a pre-cutting sub-step for fabricating at least one weakened attachment attaching a portion of the card perimeter to the substrate, a punching sub-step for creating at least one slot area between the so-called free part of the card perimeter and the substrate.

In one particular implementation, the predetermined thickness of the card is strictly less than 0.9 mm.

The method of the invention is then advantageous in that it is possible, starting from a substrate with a thickness strictly less than the minimum thickness required for a Micro SD card (i.e. 0.9 mm), to manufacture a card the physical dimensions whereof are very close to those of a Micro SD card. The cards thus produced are capable of being used with the majority of devices designed initially to cooperate with Micro SD cards.

The substrate can be compliant with the ID-1 or ID-00 card format according to the ISO 7816 standard.

Further, during the chamfer forming step, the chamfer can be made by milling. This milling step can be carried out before or after the step of defining the perimeter of the card.

Alternatively, the step of defining the perimeter of the card and the step of forming the chamfer are carried out during one and the same molding step during which the card is produced incorporated into its substrate.

In one particular implementation, the method also comprises, before the extraction of the card, a step of thinning the card so as to form a grip area starting at a predetermined distance measured from an edge of the card opposite the chamfer, the grip area extending in the direction of the perimeter having said chamfer.

This predetermined distance can vary according to the situation, as it needs to be selected so as to allow a user to remove the card from a reading device for example. The predetermined distance corresponding for instance to the distance B2 according to said Micro SD standard and is then comprised between 1.64 and 2.04 mm. Alternatively, the predetermined distance can be comprised between 1 mm and 3 mm.

According to a first embodiment, the grip area is a groove on the surface of the card opposite the surface of the chamfer.

The step of fabricating the groove can be carried out before the step of forming the perimeter described earlier.

This groove allows greater ease of handling and, in particular, the extraction of the card from reading equipment. This groove therefore has a functional advantage equivalent to that of the card edge defined by the parameters R7, R10, R11, B2, B3 and C defined by the Micro SD standard.

The groove can have a depth substantially equal to 300 μm and a width substantially equal to 2 mm.

Additionally, the groove can have a radius of curvature substantially equal to 200 μm.

According to a second embodiment, the thinning step corresponds to a milling step for partly milling the surface of the card opposite the chamfer surface so that the physical dimensions of the card comply with the parameters A, Ai, B, Bj, C2, C3, and Rm defined by the Micro SD card standard designated V3.00, wherein:

i=1, 6 ... 9;
j=1 ... 4, 6, 9 ... 11; and
m=1 ... 19.

Alternatively, when x=14 and y=15, the thinning step corresponds to a milling step such that the physical dimensions of the card comply with the parameters A, Ai, B, Bj, C2, C3, and Rm defined by the Micro SD card standard designated V3.00, wherein:

i=1, 6 ... 8;
j=1 ... 4, 10, 11, 14, 15; and
m=1 ... 19.

This second embodiment advantageously allows the manufacture of a card the physical dimensions whereof are very close to the Micro SD standard, such that it is able to operate with equipment originally designed to cooperate with Micro SD cards.

Moreover, the method can also comprise, before the extraction of the card, a step of placing a module in the card, the module comprising a microcircuit and flush contact pads complying with the Micro SD card standard. In this way, the card is particularly in compliance with the parameters A2, A3, A4, A5, B5, B7 and B8 defining the physical dimensions of Micro SD type contacts.

In one particular implementation, the module also comprises flush contact pads complying with the ISO 7816 standard.

Further, the slot area can delimit a space between the card and the substrate comprised between 300 and 400 μm.

Concurrently, the present invention relates to a card having physical dimensions compliant with the parameters A, Ai, B, Bj, C2, C3, and Rm defined by the Micro SD card standard designated V3.00, wherein:

i=1, 6 ... 9;
j=1, 4, 10, 11, x, y, the pair [x, y] being equal to [6,9] or to [14,15]; and
m=1 ... 6, 17 ... 19;

the physical dimensions also being compliant with parameter A9 of said Micro SD standard when x=6 and y=9, the card also comprising a grip area starting at a predetermined distance measured from an edge of the card opposite the chamfer, the grip area extending in the direction of the perimeter having said chamfer, the card also having a predetermined thickness strictly less than 0.9 mm.

This predetermined distance can vary depending on the situation, this having to be chosen so as to allow a user to withdraw the card from a reader for example. The predetermined distance corresponding for example to the distance B2 according to said Micro SD standard and is then comprised between 1.64 and 2.04 mm. Alternatively, the predetermined distance can be comprised between 1 mm and 5 mm, and preferably between 1 mm and 3 mm.

This card is advantageous in that it has physical dimensions near those defined by the Micro SD standard to be able to operate with equipment originally designed to cooperate with Micro SD cards.

The predetermined thickness of the card can correspond, for example, to the thickness of an ID-1 or ID-00 card according to the 7816 standard.

According to a first embodiment, the grip area is a groove made on the surface of the card opposite the chamfer.

This groove can have a depth substantially equal to 300 μm and a width substantially equal to 2 mm.

Additionally, the groove can have a radius of curvature substantially equal to 200 μm.

According to a second embodiment, the physical dimensions of the card are compliant with the parameters A, Ai, B, Bj, C2, C3, and Rm defined by the Micro SD card standard where:

i=1, 6 ... 9;
j=1 ... 4, 6, 9 ... 11; and
m=1 ... 19.

The card can also comprise a module comprising a microcircuit and flush contact pads compliant with said standard.

This module can also comprise flush contact pads compliant with the ISO 7816 standard.

DETAILED DESCRIPTION OF THE DRAWINGS

One aspect of the present invention relates to a manufacturing method for a card based on a substrate, the card having, on completion of the method, physical dimensions compliant with or close to those defined by the Micro SD standard.

A first embodiment of the invention is now described with reference to FIG. 1 through 8.

Figure 1:
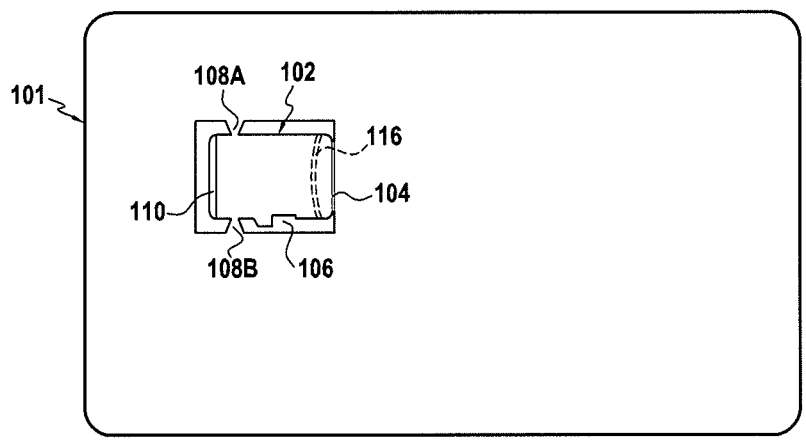
FIGS. 1 through 6 show schematically a manufacturing method according to a first embodiment of the invention.
Figure 2:
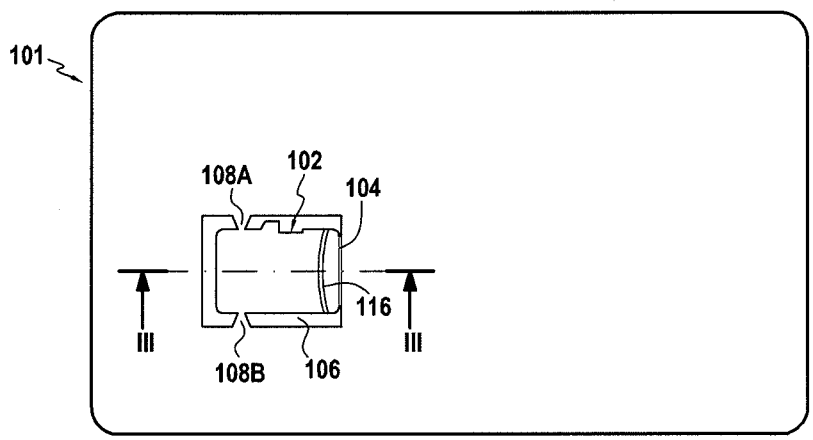
Figure 3:

FIGS. 1 and 2 show the front and back faces, respectively, of a substrate 101 including a detachable card 102. FIG. 3 corresponds to a section showing the substrate 101 and the card 102 illustrated in FIGS. 1 and 2.

Three portions denoted 104, 108A and 108B of the outer perimeter of the detachable card 102 correspond to weakened attachments of the card 102 to the substrate 101. More particularly, the attachment 104 corresponds in this example to a line of weakness, this consisting for example of at least one notch at the junction between the card 102 and the substrate 101. It will be understood that this line of weakness can consist of two notches formed facing one another on the two faces of the substrate or by a single notch on any one of the faces of the substrate 101.

Further, the weakened attachments 108A and 108B consist in this example of narrow tabs connecting the substrate 101 to a neighboring portion of the perimeter of the card 102. The weakened attachments 104, 108A and 108B are preferably designed to be broken manually by a user.

It will be noted, however, that the shape and the configuration of the weakened attachments 108A, 108B and 104 constitute only one example of implementation of the present invention. Indeed, the number and the configuration of the weakened attachments can vary, particularly as a function of the needs of the manufacturer in terms of strength in flexibility.

Moreover, a slot area 106 delimits a space between a so-called free part of the perimeter of the card 102 and the substrate 101 so that all the portions of the perimeter of the card 102 attached to the substrate 101 are attached thereto by the weakened attachments 108A, 108B and 104. In other words, the so-called free perimeter portions of the card 102 correspond to the totality of the perimeter of the card 102 with the exception of the portions located at the attachment 104 and at the junctions with the attachments 108A and 108B.

The space delimited by the slot area 106 between the card 102 and the substrate 101 can, for example, be comprised between 1 mm and 5 mm. This space can be, for example, about 1.5 mm.

The card 102 also includes a chamfer 110 on its back surface at the portion of the perimeter located opposite the attachment 104.

On its front face shown in FIG. 2, the card 102 has a groove 116 located near the attachment 104. The groove 116 can have, for example, a depth equal to 300 μm±5% and/or a width equal to 2 mm±5%. Additionally, in the example described here, the groove 116 has a radius of curvature equal to 200 μm±5%. It will be understood, however, that other physical dimensions of the groove 116 can be contemplated within the scope of the invention. Alternatively, the groove 116 can be rectilinear.

Figure 8:
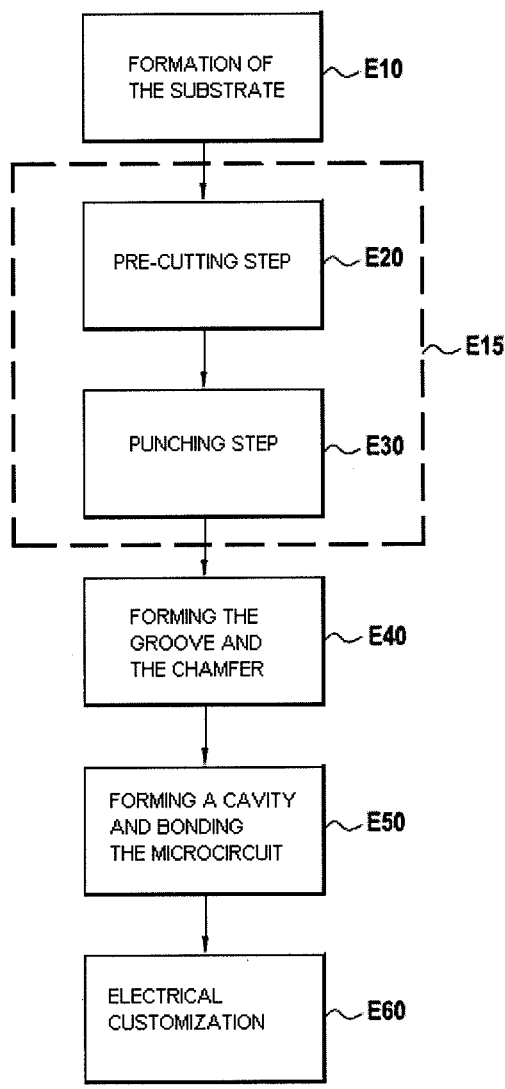
FIG. 8 shows, in the form of a flowchart, the main steps of a manufacturing method according to the first embodiment of the invention.

The card 102 illustrated in FIGS. 1 and 2 is obtained by carrying out steps E10, E15 and E40 shown in FIG. 8, in compliance with the first embodiment of the invention.

In the first place, a step E10 of forming the substrate is carried out. This formation step consists, for example of carrying out a lamination of at least two layers of a plastic (for example PVC or PET).

In the example described here, the substrate 101 is formed so as to conform to the ID-1 format defined by the ISO 7816 standard. In other words, upon completion of the formation step E10, the substrate 101 has dimensions of 85.60 mm×53.98 mm×0.76 mm (with the tolerances defined by the ISO 7816 standard).

It will be understood, however, that the substrate 101 can have other formats such as the ID-00 card format defined by the ISO 7816 standard, for example. In one alternative, the substrate 101 can have any height and width, as well as a thickness comprised between 680 μm and 840 μm or between 600 μm and 1 mm, and preferably a thickness of 760 μm.

Step E10 of forming the substrate can also comprise a sub-step of printing decorative designs (logo, image, etc.) on at least any one of the surfaces of the substrate. This sub-step of printing on the layers constituting the substrate can be carried out after, or preferably before the lamination sub-step. Alternatively, the formation of the substrate during step E10 can be carried out by molding, possibly followed by a printing sub-step as described above.

Once the formation step E10 is carried out, a step E15 of perimeter definition is undertaken which consists of defining the perimeter of the card 102 in the substrate 101. In this first embodiment of the invention, step 102 comprises the sub-steps E20 and E30.

The pre-cutting sub-step E20 allows the creation of the weakened attachment 104 connecting an edge of the card 102 to the substrate 101 (creation of a notch for example). The pre-cutting sub-step thus makes it possible to define the portion of the perimeter of the card 102 corresponding to the weakened attachment 104.

After the sub-step E20, the punching sub-step E30 is carried out, during which the slot area 106 is made between the free perimeter part of the card 102 and the substrate 101. The sub-step E30 allows the free parts of the perimeter of the card 102 to be defined and their weakened attachments 108A and 108B to be formed.

The sub-steps E20 and E30 are for example carried out in compliance with the cutting and punching methods described in the document FR 2 805 206.

It will be noted that step E15 of defining the perimeter can take place according to other alternatives which will subsequently be described in detail.

A step E40 is then undertaken during which the chamfer 110 is formed. This chamfer is made by milling of the back surface of the card 102 at the outside edge located opposite the attachment 104.

The chamfer 110 made during step E40 has physical dimensions compliant with the chamfer defined by the Micro SD standard. More particularly, the physical dimensions of the chamfer 110 are compliant with the dimensional parameters B4 and C2 of the Micro SD standard. This chamfer 110 allows in particular the insertion of the card 102 during its future use with reading equipment in particular.

Step E40 also consists of making a groove 116 on the front face of the card 102. It will be understood that the chamfer 110 and the groove 116 can naturally be made simultaneously or, alternatively, during distinct successive steps. The fabrication of this groove thus comes down to locally thinning a portion of the card. It should be noted that it is possible to carry out step E40 before step E20 or between steps E20 and E30.

At this stage in the manufacturing method according to this first embodiment, the card 102 being manufactured has physical dimensions compliant with the following parameters of the Micro SD standard:

A, Ai (i=1, 6 . . . 8), B, Bj (j=1, 4, x, y, 10, 11), C2, C3, and Rm (m=1 . . . 6, 17 . . . 19), wherein the pair [x,y] is equal to [6,9], or alternatively, to [14,15], the physical dimensions of the card also being compliant with the parameter A9 of the Micro SD standard when x=6 and y=9.

In other words, at this stage of the manufacturing method, the physical dimensions of the card are compliant with the parameters A, A1, A6 . . . A8, B, B1, B4, B10, B11, B14, B15, C2, C3, R1 . . . R6 and R17 . . . R19 defined by the Micro SD standard (case (A)), or alternatively, with the parameters A, A1, A6 . . . A9, B, B1, B4, B6, B9, B10, B11, C2, C3, R1 . . . R6 and R17 . . . R19 defined by the Micro SD standard (case (B)).

In other words, the dimensions of the card 102 at this stage of the method are compliant with all the physical specifications of the Micro SD standard (type "A" or "B") with the exception of:

the parameters specifying the contact pads defined by the Micro SD standard (according to type "A" or "B"), and parameters (B2, B3, R10 and C) specifying the card edge according to the Micro SD standard.

In this document, the term "card edge" means the relief defined by the parameters B2, B3, R10, R11 and C in the Micro SD standard, this edge being mainly designed to facilitate the manual extraction of a card from matching equipment.

It should be noted that the dimension of the card 102 corresponding to the standardized parameter C3 is preferably selected to be equal to zero (i.e. C3=0, which is compatible with the Micro SD standard).

Further, it will be noted that, according to the first embodiment described here, the groove 116 can for example be centered over the same position as that defined by the Micro SD standard for the card edge. Alternatively, this groove can be positioned at any location on the front surface of the card 102, and preferably near the edge located opposite the chamber 110.

Within the scope of the manufacturing method according to this first embodiment of the invention, steps E50 and E60 are then carried out in succession.

Figure 4:
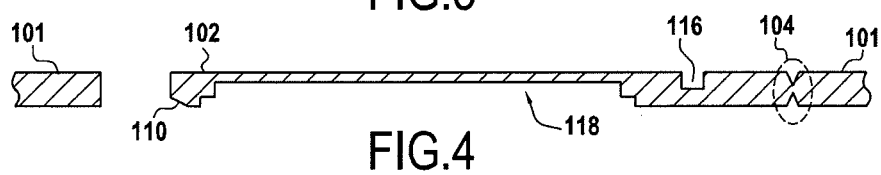

More precisely, as shown in the section in FIG. 4, a cavity 118 is made in the card 102 during step E50, from its back face.

Figure 5:
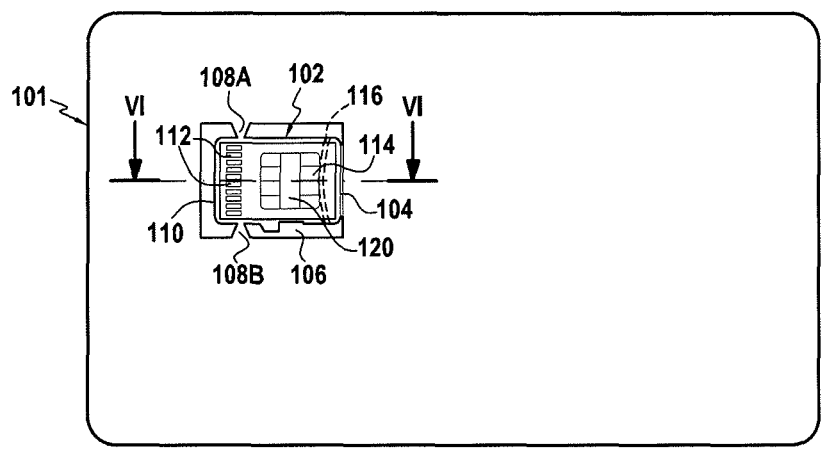
Figure 6:
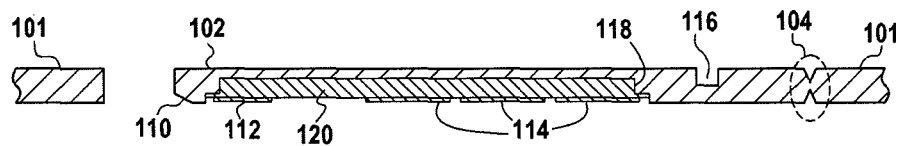

Once this cavity 118 is made, the module 120 is inserted and secured (by gluing for example) within the cavity 118. FIGS. 5 and 6 show the substrate 101 and the card 102 after step E50 is carried out.

In the example described here, the module 120 comprises a microcircuit (in the form of a chip for example) connected by connection means to a set of contact pads arranged on the back face of the card 102. This set of contact pads comprises a first series of flush contact pads 112 having physical dimensions compliant with the contact pads defined by the Micro SD standard. In the remainder of this document, this type of contacts is called "Micro SD contacts."

The exposed surface of the module 120 also comprises a second series of contact pads 114 corresponding here to flush contacts compliant with the ISO 7816 standard. In the remainder of this document, this type of contact is called "ISO contacts."

Once the module 120 is installed in the card 102, it is possible to electrically customize this module during a step E60. This step comprises at least one of the following operations:

electrical configuration of certain parameters of the microcircuit included in the module 120, loading of at least one application into the microcircuit of the module 120, storage in memory of personal data in the microcircuit of the module 120 (key(s), information pertaining to a cardholder, etc.). These data can be used later when the card 102 is used.

It is sometimes said that the electrical configuration operation and the loading of applications are carried out during a "pre-customization" of the module, whereas the recording in memory of personal data corresponds to the "customization," properly so called, of the module.

This customization step can for example be carried out using a matching head that is positioned on the ISO contacts 114. Alternatively, the module 120 can be customized by means of a matching head that is applied directly on the Micro SD contacts 112. In this case, it is not necessary that the module include the ISO contacts 114.

It is also possible to graphically customize the module 120 after step E60 by printing decorative designs on the exposed surface of the module 120.

Figure 7A:
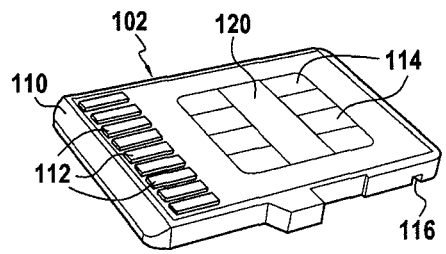
FIGS. 7A and 7B show schematically a card compliant with the first embodiment of the invention.
Figure 7B:
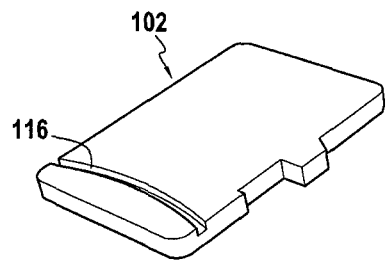

Once step E60 is carried out, the card 102 can be extracted from its substrate 101 by breaking the weakened attachments 104, 108A and 108B. In other words, the manufacturing steps E10, E15, E40, E50 and E60 are carried out before the card is extracted (or detached) from its substrate. FIGS. 7A and 7B show perspective views of the card 102 (once extracted from its substrate) according to the first embodiment of the invention.

The present invention is advantageous in that it allows the manufacture of cards the physical dimensions whereof are close to, or even totally compliant with the Micro SD format, this based on a substrate with a suitable format.

Thus the physical dimensions of the substrate (width, height, thickness) can be judiciously selected according to the production equipment that one desires to use. The presence of the substrate surrounding the card to be made facilitates in particular the manipulations and various technological operations to be carried out during the manufacturing method according to the invention.

It will be noted, for example, that certain equipment is suited to print decorative designs on ID-1 format cards complying with the ISO 7816 standard. Thus it is possible to select an ID-1 type substrate format so as to be able to use existing production equipment. In this manner, it is not necessary to adapt existing equipment in order that the latter be able to work on small size cards (such as Micro SD type cards).

Further, certain existing manufacturing equipment, configured for example to handle ID-1 cards, are capable of attaining particularly high production rate levels. The use of this equipment, and this without special adaptation, thus brings about significant gains in terms of production rate and of cost.

Other manufacturing equipment may, for example, be designed for working on cards (or substrates) the height and width whereof are compliant with the ID-1 format but the thickness whereof is arbitrary. In this case, the substrate 101 used to manufacture the card 102 can be selected such that it has the physical dimensions required by the equipment in question.

In particular, certain equipment designed to interact with ID-1 cards may sometimes tolerate thicknesses outside the range of thicknesses imposed by the ID-1 format. Such equipment can, for example tolerate thicknesses comprised between 600 µm and 1 mm.

Alternatively, the substrate 101 can have a thickness of 760±80 µm and arbitrary height and width, so as to be easily handled by suitable manufacturing equipment.

The first embodiment of the invention is advantageous in that it allows the manufacture of cards the physical dimensions whereof are very near the Micro SD standard, this based on a substrate the thickness of which is strictly less than the lower limit Cmin of the parameter C defined by the Micro SD standard, to with Cmin=900 µm. Indeed, as previously stated, at the conclusion of the formation step E40, the card 102 has physical dimensions in compliance with the parameters A, Ai (i=1, 6 . . . 8), B, Bj (j=1, 4, x, y, 10, 11), C2, C3, Dk (k=1 . . . 3) and Rm (m=1 . . . 6, 17 . . . 19) of the Micro SD standard (the pair [x,y] being equal to [6,9] or [14,15]), and possibly with the standardized parameter A9 when the pair [x,y] is equal to [6,9].

Additionally, upon completion of step E50, the card 102 includes SD contact pads compliant with the Micro SD standard. The card 102 is therefore also in compliance with the parameters A2, A3, A4, A5, B5, B7 and B8.

However, in the example considered earlier with reference to FIGS. 1 through 8, the substrate 101 has an ID-1 type format. Consequently, the thickness of the substrate 101 is on the order of 760 µm, and in any case comprised between 680 µm and 840 µm. Inasmuch as the Micro SD standard requires that the parameter C be comprised between 900 µm and 1100 µm, it is understood that, in this particular case, the thickness of the substrate is too low for a card edge compliant with the parameter C of the Micro SD standard to be implemented on the front face of the card 102.

As a Micro SD type card edge cannot be made on the card 102, a groove 116 is made during step E40. This groove has a functional advantage similar to that of the card edge defined by the Micro SD standard. Indeed, this groove 116 allows a tool or a user to more easily grip the card 102 when the latter is, for example, extracted from a matching card reader. This groove 116 is preferably designed so that a user can insert a fingernail into it when he extracts the card from equipment (mobile telephone, etc.). The groove 116 thus corresponds to a grip area.

It will be noted that in the first embodiment of the invention, the card 102 thus manufactured is not totally compliant with the physical specifications of the Micro SD standard. However, the card 102 has dimensions sufficiently similar to those required by the Micro SD standard to be able to operate normally with equipment designed to cooperate with Micro SD cards.

A second embodiment of the invention is now described with reference to FIGS. 9, 10 and 11.

Figure 9:
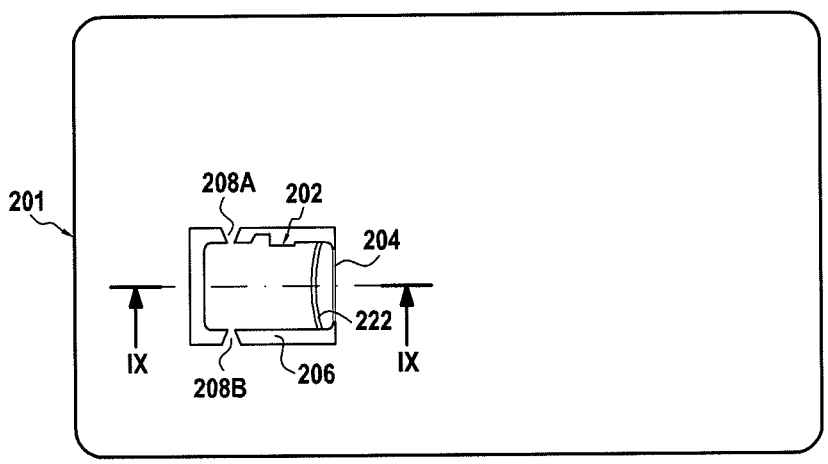
FIGS. 9, 10 and 11 show schematically a manufacturing method according to a second embodiment of the invention.

FIG. 9 shows the front face of a substrate 201 comprising a detachable card 202. The substrate 201 is connected to the card 202 by weakened attachments 204, 208A and 208B, these being respectively identical to the attachments 104, 108A, 108B previously described with reference to FIGS. 1 and 2.

Figure 10:
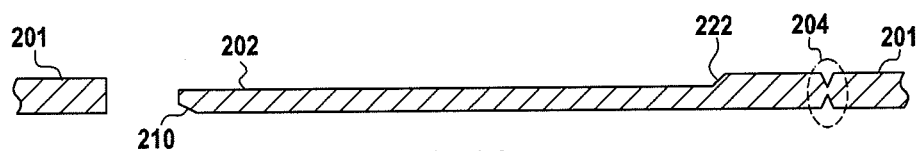

FIG. 10 shows a sectional view of the substrate 201 shown in FIG. 9.

Figure 11:
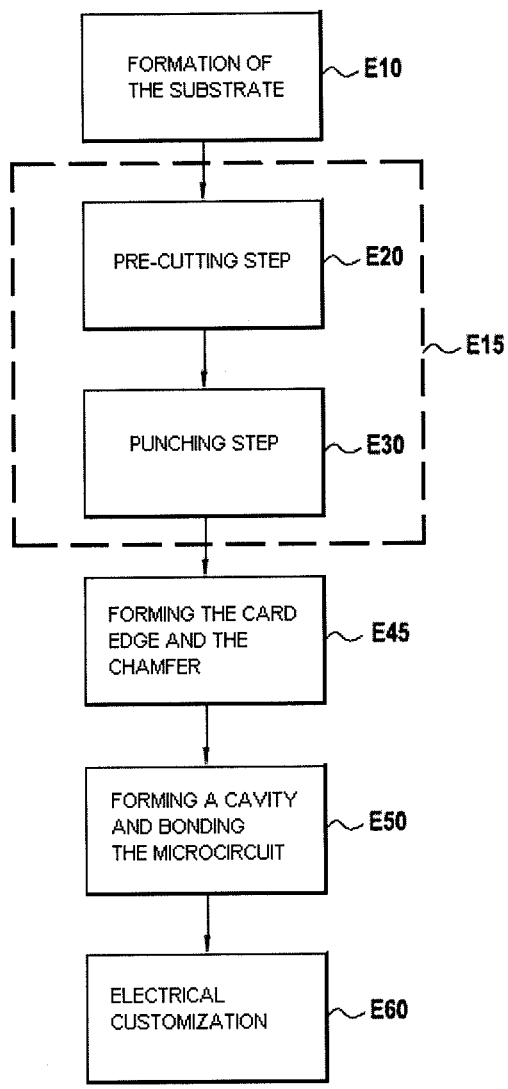

In this second embodiment, the card 202 is considered to have been obtained from the substrate 201 by carrying out step E10, then step E15 (corresponding to the sub-steps E20 and E30), as shown in FIG. 8 (see also FIG. 11). Then instead of carrying out step E40 described previously, a step E45 is undertaken.

Step E45 comprises a first milling sub-step for the purpose of forming a chamfer 210 identical to the chamfer 110 on the back face of the card 202. In other words, the chamfer 210 has physical dimensions compliant with the chamfer defined by the Micro SD standard.

Additionally, during this step E45, a second milling sub-step is carried out on a part of the front surface of the card 202. This second milling sub-step allows the formation of a card edge 222 by thinning a portion of the card. The thinned portion of the card located near the card edge 222 then corresponds to a grip area allowing for example a user to easily withdraw the card from any device.

It should be noted that it is possible to carry out step 45 before step E20 or between steps E20 and E30.

The case is now considered in which the substrate 201 formed in step E10 has a thickness at least equal to 900 µm. In this first case, it is possible during step E45 to form by milling a card edge 222 complying with the Micro SD standard, that is complying with the standardized parameters R7, R10, R11, B2, B3 and C. It will be noted that the shape and configuration of the milling tool (milling angle . . . ) are selected in such a way that the physical dimensions of the card edge 222 can be compliant with the Micro SD standard.

It will be noted that the chamfer 210 and the card edge 222 can also be made simultaneously during step E45.

Once step E45 is carried out, steps E50 and E60 are carried out as previously described.

In this first case, the second embodiment allows the manufacture of a card 202 in total compliance with the physical specifications defined by the Micro SD standard. This is possible in particular because the thickness of the substrate 201 is selected here so that it is possible to make a card edge 222 with a thickness C complying with the Micro SD standard.

In a second example the case is considered where, on completion of the formation step E10, the thickness of the substrate 201 is strictly less than 900 µm, that is the lower limit defined by the Micro SD standard for the parameter C. In this case, upon completion of step E45, the card 202 thus produced cannot be compliant with the physical specifications required by the Micro SD standard, and more particularly with respect to the parameter C.

In other words, the card 202 thus produced has physical dimensions compliant with the parameters A, Ai (i=1, 6 . . . 8), B, Bj (j=1 . . . 4, x, y, 10, 11), C2, C3, and Rm (m=1 . . . 19) defined by the Micro SD card standard (the pair [x,y] being equal to [6,9] or, alternatively, to [14, 15]), and possibly with the parameter A9 defined by the same standard when x=6 and y=9. The thickness of the card 202 can also be compliant with the parameter C1 of the Micro SD standard.

In this second hypothetical case, the second embodiment of the invention advantageously allows the manufacture of a card 202 having physical dimensions very close to those defined by the Micro SD standard. Unlike the card 102 described previously, the card 202 has an edge 222 identical or similar to that defined by the Micro SD standard. The presence of such a card edge can be necessary in certain circumstances.

In addition, though the card 202 does not exactly follow the dimensional specifications defined by the Micro SD standard, it is still likely to operate normally with most equipment designed to cooperate with Micro SD type cards.

Further, once steps E10, E20, E30 and E45 are carried out, this second embodiment can comprise the placement of a microcircuit module (not shown in FIG. 10) and the electrical customization of this module in identical fashion to steps E50 and 60 described previously.

Once step E60 is carried out, the card 202 can be extracted from its substrate 201 by breaking the weakened attachments 204, 208A and 208B. In other words, the manufacturing steps E10, E15, E45, E50 and E60 are carried out before the card is extracted (or detached) from its substrate.

The first and second embodiments of the invention described earlier are advantageous in that they allow manufacture of a detachable card from a substrate of arbitrary format. Indeed, the weakened attachment(s) formed during the sub-step E20 allow a user to manually separate the card from its substrate.

It will be noted that the first embodiment of the invention has an advantage compared with the second one described above in that it is not necessary to carry out a milling operation over a large portion of the front face of the card (as is required in the second embodiment). The front face remains substantially flat over its entire surface with the exception of the groove 122. Reducing the surface area to be milled advantageously allows:

not eliminating designs printed on the card during the formation step E10, and limiting the wear of the milling tools used.

Moreover, as stated earlier, there are several ways to carry out the perimeter definition step E15 in the manufacturing method of the invention. Indeed, in the first (or second, respectively) embodiment described previously, step E15 comprises a pre-cutting sub-step for forming a weakened attachment 104 (204, respectively) and a punching sub-step to form a slot area 106 (206, respectively) between the free part of the perimeter of the card 102 (202, respectively) and the substrate 101 (201, respectively).

Further, according to one variation of the first and second embodiments, the chamfer (110 and 210, respectively) of the card is not made by milling during the chamfer forming step (E40 and E45) but by molding. In this variation, the card (102 and 202) and the substrate (101 and 201) to which it is attached are formed simultaneously during an initial molding step, this corresponding then to all of the following steps: the substrate forming step E10, the card perimeter definition step E15 and the card chamfer forming step (110 and 210).

According to this variation, no milling is performed to form the perimeter of the card or the chamfer. Alternatively, an additional milling step can be carried out to finalize the shape of the card (of the perimeter, of the chamfer . . . ) obtained by molding.

In addition, still according to this variation, the formation of the card edge 222 during step E45 (second embodiment) can also be performed by molding during the initial molding step and not by milling as described previously.

According to a second alternative to the first and second embodiments described earlier, step E15 comprises only one punching sub-step during which a slot area is formed between the substrate and the entire perimeter of the card (102 or 202). In other words, on completion of step E15, the card is completely separated from its substrate. This alternative allows the manufacture of a card based on a substrate, the card being separated from its substrate during the manufacturing process of the invention.

It will be noted that, in this second alternative, at least one of the steps E40 (or E45), E50 and E60 is carried out before step E15, that is before the total separation of the card from its substrate. This indeed makes it possible to use, for performing at least one of the steps E40 (or E45), E50 and/or E60, production equipment suited to the format of the substrate in question.

If, for example, the formation of the chamfer 110 (or 210) is carried out before step E15, the milling tool must be applied at the edge nearest the substrate 101 (or 201); then the back surface of the substrate must be milled until the position corresponding the card chamfer 110 (or 210) is reached. In this case, the chamfer 110 (or 210) is therefore made before the formation of the perimeter of the card 102 (or 202).

The invention claimed is:

1. A method for manufacturing a card from a substrate having a predetermined thickness, comprising:
   defining a perimeter of the card within the substrate;
   forming a chamfer on a portion of the perimeter of the card, such that subsequent to said defining and forming steps the physical dimensions of the manufactured card comply with parameters A, Ai, B, Bj, C2, C3, and Rm defined by Micro SD card standard designated V3.00;
   thinning the card so as to form a curved groove beginning at a predetermined distance measured from an edge of the card opposite the chamfer before extraction of the card from said substrate, the curved groove extending in a direction of the perimeter having said chamfer, the predetermined distance corresponding to a distance B2 in accordance with said Micro SD card standard; and
   wherein $i=1, 6 \ldots 8; j=1, 4, 10, 11, x, y$, the pair [x,y] being equal to [6,9] or to [14,15], and $m=1 \ldots 6, 17 \ldots 19$, and the physical dimensions further complying with parameter A9 of said Micro SD card standard when $x=6$ and $y=9$;
   wherein said defining and forming are performed before the card is extracted from said substrate; and
   wherein said predetermined thickness is strictly less than 0.9 mm.

2. The method according to claim 1, wherein said defining and forming comprises at least one of:
   performing a pre-cutting sub-step to fabricate at least one weakened attachment for attaching a portion of the perimeter of the card to the substrate; and
   performing a punching sub-step to create at least one slot area between a free part of the perimeter of the card and the substrate.

3. The method according to claim 1, wherein the substrate complies with an ID-1 or ID-00 card format in accordance with International Organization for Standardization (ISO) 7816 standard.

4. The method according to claim 1, wherein the chamfer is created by milling during said forming.

5. The method according to claim 1, wherein the curved groove is disposed on a surface of the card opposite a surface of said chamfer.

6. The method according to claim 5, wherein the curved groove has a depth substantially equal to 300 µm and a width substantially equal to 2 mm.

7. The method according to claim 1, wherein said thinning comprises partly milling a surface of the card opposite a surface of said chamfer so that the physical dimensions of the card comply with the parameters A, Ai, B, Bj, C2, C3, and Rm defined by said Micro SD card standard;
   wherein $i=1, 6 \ldots 9; j=1 \ldots 4, 6, 9 \ldots 11$; and $m=1 \ldots 19$.

8. The method according to claim 1, further comprising:
   placing a module in said card before extraction of the card from said substrate, said module comprising a microcircuit and flush contact pads complying with the Micro SD card standard.

9. The method according to claim 8, wherein said module further comprises flush contact pads complying with International Organization for Standardization (ISO) 7816 standard.

10. A card comprising:
    a chamfer on a portion of a perimeter of said card, said card having physical dimensions in compliance with parameters A, Ai, B, Bj, C2, C3, and Rm defined by Micro SD card standard designated V3.00; and
    a curved groove beginning at a predetermined distance measured from an edge of the card opposite the chamfer, the curved groove extending in a direction of the perimeter having said chamfer, the predetermined distance corresponding to distance B2 in accordance with said Micro SD card standard;
    wherein $i=1, 6 \ldots 8; j=1, 4, 10, 11, x, y$, the pair [x,y] being equal to [6,9] or to [14,15], and $m=1 \ldots 6, 17 \ldots 19$, and the physical dimensions further complying with parameter A9 of said Micro SD card standard when $x=6$ and $y=9$; and
    wherein the card has a predetermined thickness strictly less than 0.9 mm.

11. The card according to claim 10, wherein the predetermined thickness corresponds to a thickness of an ID-1 or ID-00 card in accordance with International Organization for Standardization (ISO) 7816 standard.

12. The card according to claim 10, wherein the curved groove is formed on a surface of the card opposite to said chamfer.

13. The card according to claim 10, wherein the physical dimensions of the card comply with the parameters A, Ai, B, Bj, C2, C3, and Rm defined by said Micro SD card standard; and wherein $i=1, 6 \ldots 9, j=1 \ldots 4, 6, 9 \ldots 11$, and $m=1 \ldots 19$.

* * * * *